United States Patent [19]
Schneider et al.

[11] 3,830,643
[45]*Aug. 20, 1974

[54] REGULATION OF FLOWER AND FRUIT SET IN CULTURED PLANTS

[75] Inventors: Gerhart Schneider; Sigmund Lust; Konrad Niethammer; Ernst Jacobi; Dietrich Erdmann; Gunther Mohr, all of Darmstadt, Germany

[73] Assignee: Merck Patent Gesellschaft Mit Beschraenkter Haftung, Darmstadt, Germany

[ * ] Notice: The portion of the term of this patent subsequent to Aug. 10, 1988, has been disclaimed.

[22] Filed: Aug. 4, 1971

[21] Appl. No.: 169,119

Related U.S. Application Data

[63] Continuation-in-part of Ser. No. 817,194, April 17, 1969, Pat. No. 3,598,564, and a continuation-in-part of Ser. Nos. 326,186, Nov. 26, 1963, abandoned, and Ser. No. 310,118, Sept. 19, 1963, abandoned, and Ser. No. 736,954, June 14, 1968, Pat. No. 3,506,434, and Ser. No. 508,835, Nov. 19, 1965, Pat. No. 3,476,545.

[30] Foreign Application Priority Data
Dec. 1, 1962    Germany............................ 5497445

[52] U.S. Cl............................ 71/107, 71/86, 71/89
[51] Int. Cl................................................ A01n 9/12
[58] Field of Search....................................... 71/107

[56] References Cited
UNITED STATES PATENTS

| | | | |
|---|---|---|---|
| 3,476,545 | 11/1969 | Mohr et al. | 71/76 |
| 3,506,434 | 4/1970 | Jacobi et al. | 71/107 |
| 3,598,564 | 8/1971 | Jacobi et al. | 71/107 |

OTHER PUBLICATIONS

Plant Regulators, CDCC Positive Data Series, No. 2, June 1955, pp. a, b, c, 1 & 31.

Primary Examiner—James O. Thomas, Jr.
Attorney, Agent, or Firm—Millen, Raptes & White

[57] ABSTRACT

A method of regulating flower and fruit set in cultured plants by treatment with alkyl esters of 9-hydroxy fluorene-9-carboxylic acid.

5 Claims, No Drawings

REGULATION OF FLOWER AND FRUIT SET IN CULTURED PLANTS

CROSS-REFERENCE TO RELATED APPLICATIONS

This application is a continuation-in-part of copending application Ser. No. 817,194 filed Apr. 17, 1969, now U.S. Pat. No. 3,598,564, the contents of the latter application being incorporated by reference in the present application.

In addition, this application, by virtue of an unbroken chain of copendency with application Ser. No. 817,194, is also a continuation-in-part of applications Ser. No. 326,186 filed Nov. 26, 1963, and Ser. No. 310,118 filed Sept. 19, 1963, both now abandoned; Ser. No. 736,954 filed June 14, 1968, now U.S. Pat. No. 3,506,434 and Ser. No. 508,835 filed Nov. 19, 1965, now U.S. Pat. No. 3,476,545. The contents of all of these applications are incorporated by reference in the present application.

This invention relates to a method of regulating flower and fruit set in cultured plants.

The principal object of this invention, therefore, is to provide a method of effecting a regulation of flower and fruit set in cultured plants by treatment of the tissue responsible for flower bud initiation or of the flower clusters of said cultured plants.

Upon further study of the specification and claims other objects and advantages of the present invention will become apparent.

To attain the objects of this invention, it has been discovered that alkyl esters of 9-hydroxy-fluorene-9-carboxylic acid of formula I

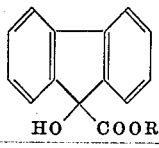

wherein
R is an alkyl group of up to 8 carbon atoms
exhibit an outstanding activity on cultured plants by influencing flower bud formation and fruit set, respectively.

Regulation of fruit set has become an important problem since in view of economic aspects, more constant crops of a high quality standard are desired, especially in fruit trees and plantations. This is true for the crop as such, i.e. the number of fruits which can be harvested as well as for the fruits as such which are desired to be in conformity with certain standards, especially with regard to their size, weight and appearance. In addition, in field crops an increase of the yields per acre is of importance.

Thus, depending on the natural development and the type of the cultured plants, an increased or decreased formation of flower buds or fruits, respectively, or even a shifting of the position of such flower buds, may be desired to obtain this aim.

It is therefore one aspect of the method of regulating flower and fruit set to obtain a fruit thinning effect and it is another aspect to obtain an increase in flowers and fructification, including the increase due to a shifting of the position of the flower buds within the shoot system of the treated plant.

A fruit thinning effect is of importance in order to eliminate parts of the flowers and/or young fruitlets to ensure good size and quality for the remaining fruits. In addition, exhaustion of the fruiting potential of the plants can be prevented.

An increase in flowers or flower bud formation, respectively, is of importance in cultured plants which tend to an excessive flowering one year followed by a certain rest period the subsequent year, with a low yield of fruits (alternance, biennial bearing). The method according to the present invention thus opens a possibility to increase the number of flowers and fruit potential for the next year's yield by applying an ester of Formula I to the plants during the preceding year.

An increase in flowers or flower bud formation, respectively, furthermore, is of importance, for example, where the formation of more flower buds in a certain region of a plant is desired. A shifting of the position of the flower buds within the shoot systems of a plant is of importance especially in those plants which have to be cut extensively. Cutting of the top parts of the shoots is connected with a cutting off of productive flower buds thus decreasing the fruiting potential. A treatment according to the present invention during the phase of flower bud initiation induces shifting of the flower buds position, for example towards the basal region, thus leading to more or at least better fruits the following year.

An improvement in fruit setting according to the method of the present invention may also be due to the formation of parthenocarpic fruit. The initiation of parthenocarpic fruit development is saving otherwise lost fruit if due to adverse growing conditions pollination of the flowers has been incomplete.

Fruit trees and other fruit bearing cultured plants are preferred species for such a treatment of regulating flower and fruit set. A large number of fruit plants can be influenced, including fruits with pips and stones, such as, for example, apple, plums, peaches, apricots, pears, cherries, grapes, pineapples, bananas, mangos, papayas, strawberries and citrus including lemons, grapefruits and oranges. The effects may likewise be obtained in plantation crops such as coffee, cocoa, oil palms, coconut palms, and date palms. Other cultured plants are vegetables such as cucurbits including cucumbers, melons, and squashes, tomatoes, peppers, eggplants, and paprica, or field crops such as soybean, peanut, field bean, broad bean, peas, other legumes, cotton, sesamum, and poppy. Even flowers (ornamentals) may be treated since an increase in flower bud formation and/or a shifting of the flower bud position may be highly interesting.

Application may take place at any time during the active growing phase of the cultured plants. For fruit thinning or for improvement in fruit setting, treatment is possible from the early stage of unopened flower buds or flower clusters to the end of the flowering period and even during a certain period after full blooming which, however, in general does not exceed 4 to 6 weeks. The preferred period is between the early stage of flowering and about 20 days after full-blooming.

For a shifting of the flower buds position within the shoot system, treatment is to be effected during the phase of flower bud initiation for the next year's flowering.

The increase in flower bud formation in case of preventing alternance is likewise best obtained by a treatment of the tissues responsible for flower bud initiation during the fruit bearing year.

Among the compounds of Formula I, those are preferred wherein R represents a straight alkyl group, e.g., methyl, ethyl, n-propyl, n-butyl, n-amyl, n-hexyl, n-heptyl, and n-octyl. The n-butyl ester is of particular interest.

The 9-hydroxy-fluorene-9-carboxylates of Formula I are partially known compounds or may be obtained by standard techniques from the basic acid. Most suitable is the direct esterification.

The above-mentioned fluorene derivatives are highly active. They are absorbed by the plant, transported in it and apparently selectively enriched in meristematic tissue, especially in the vegetation points. Thus, they intervene in the developmental processes of intact plants. They are furthermore characterized by an outstandingly low phytotoxicity. Another important fact is the limited life-time of the active compounds in the plant and in the soil which generally extends over some weeks only. In consequence, no problems arise from residuals, neither in the harvested products nor in the soil.

Characteristic for the active compounds is their preferential intervention in meristematic tissues which are in an active state of division such as tissue of the main vegetation points or of the cambium. Meristematic tissues in a resting state or tissues and organs already fully differentiated at the time of treatment are scarcely influenced.

Their fruit set regulating activity extends over an extremely wide range of concentration within which the active compounds display their activity with different strength and duration, i.e. at concentrations varying within a range from 0.05 to 5000 ppm (parts per million), depending on the type of plant, the method of application and external influences. The preferred range varies from 0.5 to 500 ppm.

The active substances can be worked up to all forms of preparations customary for such a use in plants. As additives and fillers the usual materials are employed. For liquid formulations, xylene, solvent naphtha, petroleum, acetone, cyclohexane, dimethyl formamide, aliphatic alcohols or even water are used as solvents. Emulsion concentrates can be marketed as such. Before use, the emulsion concentrates are diluted with water in the usual manner. Clay, kaolin, bentonite, ground shale, talc, chalk, dolomite or kieselguhr can be used insofar as solid preparations are concerned. Application is possible by all common methods such as spraying, pouring, scattering, or dusting. Application of liquid formulations is preferred.

The fluorene carboxylic acid derivatives are advantageously formulated as emulsion concentrates with a content of 5 to 95, preferably 50 percent by weight, of active material. Wettable powders or granulates are likewise suitable.

In a publication by R. A. Heacock et al. in Annals of Applied Biology, 46 (3), pages 352 – 356 (1958), there is described, inter alia, the testing of structurally similar compounds, namely fluorene-9-carboxylic acid and the corresponding 9-methyl derivative regarding their properties as growth-promoting substances in the classical cell extension test with isolated organ parts; the tests described do not allow any predictions regarding possible activity of the active compounds of this invention when used for regulating fruit set in intact plants.

The same applies to a publication by R. L. Jones et al. in Journal of the Science of Food and Agriculture, Volume 5, pages 44 – 47 (1954), describing an activity of, for example, 9-hydroxy-fluorene-9-carboxylic acid and the methyl and butyl esters thereof which are influencing the geotropic and phototropic reactivity of seedlings. This paper demonstrates only that the fluorene compounds mentioned therein possess a certain cell-extending activity.

Furthermore, 9-hydroxy-fluorene-9-carboxylic acid was tested in a screening program for various responses in plants according to PLANT REGULATORS, Chemical-Biological Coordination Centre, Positive Data Series No. 2, of June 1955. The esters of the present invention are, however, neither mentioned nor suggested and their regulating activity in flower and fruit setting when applied in a definite concentration cannot be deduced therefrom.

The following examples are to illustrate the activity of the active compounds. n-Butyl 9-hydroxy-fluorene-9-carboxylate has been chosen to demonstrate the influence on fruit setting, but the effects described may likewise be obtained with the other esters mentioned herein, especially with the methyl, n-hexyl and n-heptyl esters of 9-hydroxy-fluorene-9-carboxylic acid.

EXAMPLE 1

Fruit thinning.

A selected part of an apple tree (variety Jonathane) was sprayed 2 weeks after full blooming. The dosage of n-butyl-9-hydroxy-fluorene-9-carboxylate applied was 0.1, 1, and 10 ppm. For evaluation, the central buds of the flower clusters were counted.

The following Table I shows the number of flowers of said central buds, the number of fruit which originated therefrom, and the percentage of fructification (fruit set) derived from these results.

It is clearly shown that n-butyl 9-hydroxy-fluorene-9-carboxylate has a remarkable fruit thinning effect.

No phytotoxic effects were observed.

TABLE I

| ppm | Flower buds | | |
|---|---|---|---|
| | No. of flowers | No. of fruits | % fructification |
| 10 | 45 | 15 | 33 |
| 1 | 46 | 16 | 35 |
| 0.1 | 45 | 15 | 33 |
| control | 54 | 33 | 61 |

Similar results were obtained in pears.

EXAMPLE 2

Fruit thinning.

The test was conducted in citrus fruit. The variety of trees tested was Unshu orange (var. Miyagawa wase), 9 years old. 1 tree was used per block and the branches were treated. The concentrations of n-butyl 9-hydroxy-fluorene-9-carboxylate applied were 12.5, 25, 50, 100, and 200 ppm. About 50 fruits were tested per block and the average number for 6 blocks was evaluated.

The following Table II shows the results obtained. The fruit thinning effect is clearly evident.

TABLE II

| ppm | % fructification July 29 | Rate of fructification to untreated plot | Yield % Nov. 12 |
|---|---|---|---|
| 12.5 | 36.3 | 73.6 | 34.5 |
| 25 | 34.3 | 69.6 | 29.8 |
| 50 | 27.6 | 56.0 | 24.9 |
| 100 | 17.5 | 35.5 | 16.5 |
| 200 | 19.6 | 39.7 | 18.6 |
| control | 49.3 | (100) | 47.8 |

No phytotoxic effects were observed, neither in the fruit nor in the leaves or fallen leaves. No negative effects could be found as to color, hardness, percentage of sarcocarp and content of sugar and acidity of the fruits. On the other hand the average weight per fruit showed increasing tendency due to the fruit thinning effect. The following Table III gives a survey on those effects.

TABLE III

| ppm | Average weight per fruit (g) | Influence on fruit quality | | | Sugar | Citric acid (g/100cc) |
|---|---|---|---|---|---|---|
| | | Color (Index) | Hardness (kg) | Percent of sarcocarp | | |
| 12.5 | 87.1 | 6.8 | 6.9 | 79.8 | 9.9 | 1.051 |
| 25 | 97.3 | 6.5 | 7.1 | 78.6 | 9.7 | 1.021 |
| 50 | 101.3 | 6.5 | 6.9 | 78.5 | 9.3 | 1.103 |
| 100 | 110.1 | 6.5 | 7.1 | 78.0 | 9.6 | 1.021 |
| 200 | 107.8 | 6.7 | 7.1 | 78.4 | 9.9 | 1.154 |
| Untreated | 83.5 | 6.5 | 6.9 | 78.7 | 9.6 | 1.045 |

EXAMPLE 3

Fruit thinning

The tested trees were peach trees var. Reiko which were treated 5 days and 10 days, respectively, after full blooming. The concentrations used of n-butyl 9-hydroxy-fluorene-9-carboxylate were 5 and 10 ppm. Compared with the untreated plots, the fruit thinning effect was about 20 – 40 %, and the fruiting percentage was about 20. There was no significant difference between the two dosages applied.

The corresponding 9-hydroxy-fluorene-9-carboxylic acid did not show any effect when sprayed for comparison even with the 10 ppm concentration.

EXAMPLE 4

Increase in fructification.

The tests were conducted in cherry trees (Bigarreau Moreau) in two different places. For each test, one tree was used in a certain plot with four repetitions per dose.

The application was effected by spraying. The branches were wetted until run-off of the liquid sprayed. One branch was used per dose, the branches being selected because of their exuberant flowering.

Treatment occured on April 3 which was the beginning of flowering. The flowers were counted at the moment of treatment, fruits were counted just before harvesting (May 25).

The following Table IV shows the results obtained. The rate of fruit set and of fruit is significantly increased in trees treated with n-butyl 9-hydroxy-fluorene-9-carboxylic acid, both in comparison with the control and CEPA (Chloroethane phosphonic acid) which was included in the test for comparative purposes.

TABLE IV

| product | dose ppm | tree | flowers | fruits | rate of fruit set |
|---|---|---|---|---|---|
| n-butyl 9-hydroxy-fluorene-9-carboxylate | 5 | 1 | 170 | 57 | 33.5 |
| | | 2 | 185 | 54 | 29.2 |
| | | 3 | 260 | 51 | 19.6 |
| | | 4 | 205 | 23 | 11.2 |
| | | average | | | 23.2 |
| | 30 | 1 | 310 | 102 | 32.9 |
| | | 2 | 165 | 46 | 27.9 |
| | | 3 | 515 | 117 | 22.7 |
| | | 4 | 230 | 21 | 9.1 |
| | | average | | | 23.1 |
| chloroethane phosphonic acid (CEPA) | 30 | 1 | 365 | 69 | 18.9 |
| | | 2 | 205 | 48 | 23.4 |
| | | 3 | 280 | 57 | 20.4 |
| | | 4 | 115 | 9 | 7.8 |
| | | average | | | 18.4 |
| control | — | 1 | 220 | 55 | 25.0 |
| | | 2 | 620 | 122 | 19.6 |
| | | 3 | 405 | 112 | 27.6 |
| | | 4 | 740 | 23 | 3.1 |
| | | average | | | 18.8 |

EXAMPLE 5

Increase in fructification.

The test described in Example 4 was conducted in another place, likewise with cherries (Bigarreau Moreau). Treatment took place on April 17, during the stage of full blooming. Counting of the fruits was done just before harvesting on May 25.

The following Table V shows that the treatment with n-butyl 9-hydroxy-fluorene-9-carboxylate significantly increased the fruit set.

Gibberelic acid which was used for comparison provoked slight phytotoxicity on the leaves. Furthermore, a number of fruits on the treated branches did not show normal development, in contrast to the cherries treated with the fluorene derivatives.

TABLE V

| product | dose ppm | tree | flowers | fruits | rate of fruit set |
|---|---|---|---|---|---|
| n-butyl-9-hydroxy-fluorene-9-carboxylate | 5 | 1 | 220 | 47 | 21.3 |
| | | 2 | 210 | 16 | 7.6 |
| | | 3 | 220 | 34 | 15.4 |
| | | 4 | 160 | 65 | 40.6 |
| | | average | | | 21.2 |
| | 30 | 1 | 360 | 91 | 25.2 |
| | | 2 | 170 | 22 | 12.9 |
| | | 3 | 400 | 102 | 25.3 |
| | | 4 | 160 | 29 | 18.2 |
| | | average | | | 20.4 |

TABLE V-Continued

| product | dose ppm | tree | flowers | fruits | rate of fruit set |
|---|---|---|---|---|---|
| chloro-ethane phosphonic acid (CEPA) | 30 | 1 | 210 | 15 | 7.1 |
| | | 2 | 200 | 12 | 6.0 |
| | | 3 | 190 | 16 | 8.1 |
| | | 4 | 110 | 10 | 9.1 |
| | | average | | | 7.6 |
| Gibberelic acid | 45 | 1 | 290 | 6 | 2.0 |
| | | 2 | 320 | 27 | 8.4 |
| | | 3 | 110 | 10 | 10.3 |
| | | 4 | 280 | 29 | 9.1 |
| | | average | | | 7.0 |
| | 90 | 1 | 170 | 16 | 9.4 |
| | | 2 | 280 | 10 | 3.5 |
| | | 3 | 180 | 15 | 8.3 |
| | | 4 | 120 | 7 | 5.8 |
| | | average | | | 6.7 |
| control | — | 1 | 250 | 19 | 7.6 |
| | | 2 | 140 | 17 | 12.2 |
| | | 4 | 280 | 50 | 17.8 |
| | | average | | | 15.3 |

EXAMPLE 6

Increase in flower bud set and shifting of flower bud position within the shoot system.

The test was conducted in peach trees, variety "Champion".

It is known that in peach trees, the generation tendencies are weakened in the basal area of the shoots. Therefore, the number of flower buds often is smaller in this basal area. This is a limiting factor with respect to the yields obtainable since particularly in peach trees a strong cutting of the shoots is necessary.

It has been found that 9-hydroxy-fluorene-9-carboxylates are able to increase the number of flower buds in the basal region of peach trees. Spraying with liquid formulations obtained from 12.5 % emulsion concentrates was effected on May 16 and June 1. Four times 5 trees were used per dose and treatment. At the end of October, the rudimentary flower buds were counted in the treated basal region, i.e. six times five shoots per treatment.

The following Table VI shows that the flower buds in this region were significantly increased.

No fruit fall was observed after treatment.

TABLE VI

| Treatment | | Number of flower buds in % of control |
|---|---|---|
| May 16 | June 1 | |
| 10 ppm | | 159 |
| 20 ppm | | 157 |
| 30 ppm | | 123 |
| | 30 ppm | 147 |
| | 50 ppm | 153 |
| control | | 100 |

This shows a way for an induction of more productive flower buds in the basal region and thus higher yields in spite of strong cutting.

EXAMPLE 7

Fruit thinning.

The test was conducted in peach trees, 9 years of age. Application of the test compounds was done by spraying liquid formulations. The concentrations of n-butyl 9-hydroxy-fluorene-9-carboxylate were 10, 20, and 30 ppm. The time of application was 12 days after full blooming (50 % open blossoms).

The elementary unit was one tree, 5 repetitions were made.

The treatment was effected on April 2, harvesting on June 26. In the following Table VII, the results obtained are compiled. The fall of flowers and fruits, respectively, after treatment is given in comparison to natural fall of untreated trees grown under equal conditions.

The average weight of fruits was determined from the total crop from trees which obtained equal treatments.

The index W represents the ratio formed from the total weight of harvested fruits and the weight of fruits with a weight equal or inferior to that which corresponds to 40 fruits on a plate of 57 × 34 cm (European Norm), after the same treatment.

TABLE VII

| conc ppm | fall after treatment | average weight of fruits | Index W |
|---|---|---|---|
| 10 | 15% | 110.2 g | 1.90 |
| 20 | 8% | 105.0 g | 1.53 |
| 30 | 5% | 108.0 g | 1.62 |
| control | 0 | 102.2 g | 1.40 |

Under the test conditions, no phytotoxic effects have been observed, neither on the general vegetation nor on the fruits. The fruit thinning effect was satisfactory.

EXAMPLE 8

Increase in flower set and blooming.

Single potted plants of azalea indica were sprayed with 50 ml per plant of a liquid formulation of n-butyl-9-hydroxy fluorene-9-carboxylate until complete wetting of the foliage (three replicates per treatment). Treatment took place in June on one year, evaluation in February of the following year. The number of blossoms (opened flower buds) was counted. The means value of 3 evaluations is given in the following Table VIII. The number of blossoms of the control was taken for comparison (100).

TABLE VIII

| conc. ppm | number of blossoms per plant (averaged from 3) | | |
|---|---|---|---|
| | Febr. 2 | Febr. 14 | Febr. 29 |
| n-butyl-9-hydroxy-fluorene-9-carboxylate | | | |
| 20 | 42 | 130 | 136 |
| 10 | 210 | 188 | 162 |
| 500 | 140 | 202 | 158 |
| control | — | 100 | 100 | 100 |

The free acid (9-hydroxy fluorene-9-carboxylic acid) was sprayed for comparison. No positive effect could be observed as to an increase of the number of blossoms up to the 100 ppm concentration. With 500 ppm, a slight but not significant effect was observed.

With respect to formulation of the active compounds, the following examples are given for illustration.

The parts given are parts by weight.

EXAMPLE I 12.5 parts n-butyl-9-hydroxy-fluorene-9-carboxylate 12.5 parts dimethylformamide
65 parts benzene
10 parts emulsifier (alkylarylsulfonate + polyoxyethylene-tall oil ester)

EXAMPLE II 42 parts n-butyl-9-hydroxy-fluorene-9-carboxylate
25 parts solvent-naphtha
30 parts xylene
3 parts emulsifier (mixture of nonylphenol polyglycol ether and calcium dodecylbenzene-sulfonate).

EXAMPLE III 40 parts n-butyl-9-hydroxy-fluorene-9-carboxylate
10 parts cyclohexanone
45 parts benzene
5 parts emulsifier (alkylarylsulfonate + nonylphenol-polyglycolether)

In a similar manner, other esters of 9-hydroxy-fluorene-9-carboxylic acid may be formulated, such as the methyl, ethyl, n-propyl, n-amyl, n-hexyl, n-heptyl, and n-octyl ester.

What is claimed is:

1. A method of regulating flower and fruit set in cultured plants which method comprises applying to said cultured plants at least one compound of the formula

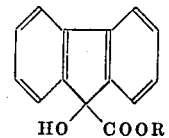

wherein R is an alkyl group of up to 8 carbon atoms, in a concentration of 0.05 to 5000 ppm.

2. A method in accordance with claim 1 wherein the concentration is between 0.5 and 500 ppm.

3. A method in accordance with claim 1 wherein the cultured plants are fruit trees.

4. A method in accordance with claim 1 wherein said compound is n-butyl-9-hydroxy fluorene-9-carboxylate.

5. A method as defined by claim 4 wherein said compound is applied in the form of a liquid preparation.

* * * * *